United States Patent
Dopfer et al.

(10) Patent No.: US 9,928,678 B2
(45) Date of Patent: Mar. 27, 2018

(54) INPUT MODULE AND METHOD FOR FEEDING VALUE DOCUMENTS TO A VALUE-DOCUMENT PROCESSING APPARATUS AND SYSTEM FOR PROCESSING VALUE DOCUMENTS

(71) Applicant: GIESECKE & DEVRIENT GMBH, München (DE)

(72) Inventors: Peter Dopfer, Geltendorf (DE); Wolfgang Königer, Karlsfeld (DE); Evelyn Guldner, München (DE); Erwin Demmeler, Memmingen (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 15/102,449

(22) PCT Filed: Dec. 9, 2014

(86) PCT No.: PCT/EP2014/003292
§ 371 (c)(1),
(2) Date: Jun. 7, 2016

(87) PCT Pub. No.: WO2015/086145
PCT Pub. Date: Jun. 18, 2015

(65) Prior Publication Data
US 2016/0314638 A1 Oct. 27, 2016

(30) Foreign Application Priority Data
Dec. 11, 2013 (DE) ........................ 10 2013 020 895

(51) Int. Cl.
*G07D 11/00* (2006.01)
*B65G 1/10* (2006.01)
(Continued)

(52) U.S. Cl.
CPC ........... *G07D 11/0006* (2013.01); *B65G 1/02* (2013.01); *B65G 1/04* (2013.01); *B65G 1/06* (2013.01);
(Continued)

(58) Field of Classification Search
CPC . B65G 65/02; B65G 1/02; B65G 1/04; B65G 1/06; B65G 1/10; B65G 1/16;
(Continued)

(56) References Cited

U.S. PATENT DOCUMENTS 4,669,393 A 6/1987 Wiithrich
5,498,122 A 3/1996 Miura et al.
(Continued)

FOREIGN PATENT DOCUMENTS

DE 102007043129 A1 3/2009
DE 102009042891 A1 3/2011
(Continued)

OTHER PUBLICATIONS

German Search Report for corresponding German Application No. 102013020895.5, dated Mar. 31, 2014.
(Continued)

*Primary Examiner* — David H Bollinger
(74) *Attorney, Agent, or Firm* — Workman Nydegger

(57) ABSTRACT

An input module and a corresponding method involve feeding value documents to at least one value-document processing apparatus having a removal device for removing value documents from a first container located in a removal position and feeding the removed value documents to the value-document processing apparatus, an output device for receiving at least one container in an output position in which the container can be removed, and a conveying device for conveying the container within the input module. The input module and system have a simple and compact con-
(Continued)

struction, and employ a simple procedure for feeding value documents to a value-document processing apparatus.

14 Claims, 4 Drawing Sheets

(51) Int. Cl.
| | |
|---|---|
| *B65G 65/02* | (2006.01) |
| *B65G 1/02* | (2006.01) |
| *B65G 1/16* | (2006.01) |
| *B65G 1/04* | (2006.01) |
| *B65G 1/06* | (2006.01) |

(52) U.S. Cl.
CPC ............... *B65G 1/10* (2013.01); *B65G 1/16* (2013.01); *B65G 65/02* (2013.01); *G07D 11/0018* (2013.01); *G07D 11/0021* (2013.01); *G07D 11/0036* (2013.01); *G07D 11/0048* (2013.01)

(58) Field of Classification Search
CPC ........... G07D 11/0006; G07D 11/0018; G07D 11/0021; G07D 11/0036; G07D 11/0048
USPC ............ 414/222.01, 222.07, 222.04, 222.08, 414/222.11, 225.01
See application file for complete search history.

(56) References Cited

U.S. PATENT DOCUMENTS

| | | |
|---|---|---|
| 6,164,961 A | 12/2000 | Luscher et al. |
| 8,695,968 B2 | 4/2014 | Dopfer et al. |
| 2001/0031197 A1 | 10/2001 | Jager |
| 2010/0194029 A1 | 8/2010 | Dopfer et al. |
| 2011/0072987 A1* | 3/2011 | Nobuhara .......... G07D 11/0021 100/7 |
| 2012/0011813 A1* | 1/2012 | Nakai ................ B65B 27/08 53/447 |
| 2012/0175217 A1 | 7/2012 | Demmeler |
| 2013/0047869 A1* | 2/2013 | Kataoka ............. G07D 11/0021 100/8 |
| 2015/0179013 A1* | 6/2015 | Dopfer ............... B65H 31/3045 414/416.08 |

FOREIGN PATENT DOCUMENTS

| | | |
|---|---|---|
| EP | 2620377 A2 | 7/2013 |
| WO | 0152196 A1 | 7/2001 |

OTHER PUBLICATIONS

International Search Report for corresponding International PCT Application No. PCT/EP2014/003292, dated Apr. 8, 2015.

* cited by examiner

INPUT MODULE AND METHOD FOR FEEDING VALUE DOCUMENTS TO A VALUE-DOCUMENT PROCESSING APPARATUS AND SYSTEM FOR PROCESSING VALUE DOCUMENTS

BACKGROUND

This invention concerns an input module and a method for feeding value documents to a value-document processing apparatus and a system for processing value documents according to the independent claims.

In value-document processing apparatuses, value documents, such as bank notes, checks or vouchers, are checked for different properties, such as denomination, authenticity and state, and treated differently depending on the result of the check. For example, bank notes classified as authentic upon the check are returned to circulation provided they simultaneously meet certain fitness criteria. In contrast, bank notes classified as false or suspect are taken out of circulation, and soiled, worn or defective bank notes are fed to a shredder for destruction. Further, in value-document processing systems the respectively inputted value documents can be counted and/or their total value established.

Prior to processing in a value-document processing apparatus, the value documents are usually prepared manually. For this purpose, information is captured from the value documents usually delivered by the stack, such as particulars about the depositor, an account number, a transaction number, the quantity or the value of the value documents forming a deposit, and the value documents are inserted by the stack into a value-document container in which the individual value-document stacks are mutually separated by so-called header cards or separation cards. The value-document container loaded with different value-document stacks is then brought to a value-document processing apparatus on which the value documents located in the value-document container are fed by the stack to an input pocket of the value-document processing apparatus for further processing.

From DE 10 2007 043 129 A1 it is known to insert the value documents prepared at a preparation location into a container of a firmly installed container transport system through which the containers are transported to the value-document processing apparatus at which the containers are accepted by an operating person or robot and the value documents located therein are inserted into an input pocket of the value-document processing apparatus.

From DE 10 2009 042 891 A1 there is further known a transport system for value-document containers which is directly connected to the value-document processing apparatus and transports containers loaded with value documents to the input pocket of the value-document processing apparatus, where the value documents located in the container are removed from the container by means of a gripper and inserted into the input pocket of the apparatus.

SUMMARY

It is the object of the present invention to specify an input module and a corresponding method for feeding value documents to a value-document processing apparatus and a system for processing value documents which can respectively be constructed or carried out as compactly and simply as possible.

The input module according to the invention for feeding value documents, in particular bank notes, to at least one value-document processing apparatus has: a removal device for removing value documents from a (first) container located in a removal position and for feeding the removed value documents to a value-document processing apparatus; an output device for receiving at least one container in an output position in which the container can be removed; and a conveying device which is configured for conveying a container located in the receiving position out of the receiving position into the removal position in which value documents can be removed from the container by the removal device, and which is configured for conveying a container located in the removal position out of the removal position into the output position in which the container can be received by the output device. The removal device can be configured as a gripper which can remove the value documents from the container by the stack. The input module has in particular a receiving opening at which a container loaded with value documents can be received.

In particular, the conveying device can convey a following second container such that the first container located in the removal position is transported by the second container, conveyed by the conveying device, out of the removal position into the output position in which the first container can be received by the output device, and the second container is thereupon conveyed back to the removal position.

The method according to the invention for feeding value documents, in particular bank notes, to at least one value-document processing apparatus has the following steps:
a) (manually or automatically) supplying at least one container in which value document are located, in a receiving position of a receiving device of the input module,
b) conveying the container located in the receiving position out of the receiving position into a removal position of the input module (10), in which position value documents are removed from the container,
c) removing value documents from the container located in the removal position using a removal device of the input module,
d) feeding the value documents removed from the container to a value-document processing apparatus using the removal device of the input module,
e) conveying the container located in the removal position out of the removal position into an output position in which the container is received by an output device of the input module,
f) (manually or automatically) removing the container located in the removal position.

In particular, the method can involve carrying out the following steps: removing value documents from a first container located in a removal position; feeding the removed value documents to a value-document processing apparatus; conveying a second container in which value documents are preferably located, such that the first container located in the removal position from which value document were removed is transported by the conveyed second container out of the removal position into an output position in which the first container is received; and conveying the second container back to the removal position.

The system according to the invention for processing value documents, in particular bank notes, has a value-document processing apparatus for processing, in particular checking and/or counting and/or sorting, value documents and is further characterized by the input module according to the invention. The input module according to the invention can be arranged in the region of the value-document processing apparatus merely temporarily, by for example being displaced toward the value-document processing apparatus. However, it is also possible that the input module is coupled to the value-document processing apparatus permanently and/or forms a fixed part of the value-document processing apparatus.

For feeding value documents, in particular bank notes, located in containers to a bank-note processing apparatus, the invention is based on the approach of providing an input module at which containers filled with bank-note stacks can be supplied, which are then conveyed individually in the interior of the input module to a removal position at which the bank notes located in the respective container are then removed from the container by the stack by means of a removal device, for example a gripper, and inserted into an input pocket of a bank-note processing apparatus. The (empty or nearly empty) container still located in the removal position after the bank-note removal is thereupon transported to an output position in which it can then be removed by an operating person.

The invention therefore simplifies the construction of the input module or system and increases its compactness and also guarantees a simple procedure for feeding value documents to a value-document processing apparatus.

The transport of the empty container located in the removal position to the output position is brought about here for example by a following container, preferably filled with bank notes, being conveyed to the input position while taking along the empty container located in the input position and moving it out of the input position. The following container is then conveyed in the direction of the output position until the empty container transported thereby is received and held in the output position. The following container is thereupon conveyed back to the input position again and held there, preferably by means of a suitable holder, in the removal position in which it is now available for removal of the bank notes located therein by means of the removal device.

Jointly transporting the following loaded container together with the empty preceding container until the empty container is received in the output position and thereafter displacing the loaded container back to the input position achieves the result that only one conveying unit, for example in the form of a lift, is required for conveying a following, still loaded container into the input position, on the one hand, and transporting an empty container located in the input position into the output position, on the other hand. Otherwise, the conveying device would have to be constructed more elaborately.

In connection with the invention, a "first container" is preferably to be understood as any container that is to be transported out of the input position into the output position. In connection with the present invention, the first container is also designated "preceding container". Further, a "second container" is preferably to be understood as any container that is the next one following the first container located in the input position, and can hence also be designated "following container". It is basically irrelevant whether the first and/or second container contains value documents. However, the first container to be transported from the input position to the output position has preferably been completely emptied, whereas the following second container contains value documents.

Preferably, the conveying device is configured for conveying the second container such that upon transport of the first container from the removal position to the output position the second container contacts a side, in particular the underside, of the first container and/or the second container docks to the first container and/or couples to the first container. The immediate contact of the containers or docking or coupling attains a secure and at the same time simply realized coupling of the two containers. A coupling of the two containers can be effected for example by form closure and/or force closure. A coupling by contact of the underside of the first container is advantageous in particular when the latter is to be conveyed into an output position lying above the input position, since in this case the first container to be transported can simply rest on the conveyed second container. By suitably designing the underside and the upper edge of the containers one can additionally enable the underside of the first container to be inserted into the upper edge of the second container, so that the second container can be coupled to the first container especially reliably.

It is further preferred to configure the conveying device for conveying the second container such that upon transport of the first container from the removal position to the output position the first container is lifted or pushed by the second container. A transport of the first container by lifting comes into consideration in particular when the output position lies above the input position. Pushing of the first container by the conveyed second container is preferred when the output position is located substantially laterally of the removal position. These variants constitute further ways of transporting the first container by the following second container that are likewise realizable especially simply and compactly.

Preferably, the output position is located above the removal position. As explained hereinabove, a transport of the first container to the output position can be realized in an especially simple, secure and compact manner in this variant.

In a further preferred embodiment, a receiving device is provided which is configured for receiving at least one container in which value documents are located, in a receiving position in which the at least one container can be supplied. Supplying of the containers is preferably effected by an operating person who places the container or containers on or in the receiving device. If a container is already located in the receiving device in the receiving position, further containers are preferably simply stacked on said container, so that there is received in the receiving device a container stack composed of two or more containers. The hereinabove already described design of the underside and of the upper edge of the containers can attain an especially secure stacking of the containers.

In a further particularly preferred embodiment, the input module has a, preferably substantially closed, housing which preferably only has openings which are provided for receiving and removing filled or emptied containers and for inputting value documents to an input pocket of the value-document processing apparatus. In particular, the housing has: a receiving opening at which the receiving device is provided and/or a removal opening at which the removal device is provided, so that value documents removed, for example by means of a gripper, from the container located in the removal position can be fed through the removal opening to a value-document processing apparatus, and/or an output opening at which the output device is provided. The removal opening is located on a housing side of the input module facing the value-document processing apparatus. Preferably, the conveying of the containers and the removal of value documents from the containers take place in the interior of the housing and are thereby inaccessible to an operating person, which increases both security with respect to unauthorized or unwanted manual access, and safety in terms of the risk of injury, for example by the gripper upon removal of the value documents.

Preferably, the removal module has an alignment device for aligning value documents located in a container. The value documents are preferably respectively aligned at one or both value-document edges (longitudinal edge/transverse edge) with one or two wall surfaces of the container, such as with a side wall and/or bottom wall, by the container being set in a suitable aligning motion. This attains in a simple and reliable manner the result that the value documents to be removed from the container thereupon located in the input position are already aligned and, after their removal from the container, can be inputted to the input pocket of the value-document processing apparatus directly, i.e. without having to be aligned first.

Preferably, the alignment device is designed for setting the container in an oscillating or jerking motion by which the container is moved alternately in a first direction and in a second direction opposite the first direction, wherein the velocity of the container's motion increases in the first direction until the time point of reversal of the direction, and the magnitude of the velocity of the container's motion decreases in the second direction after the time point of reversal of the direction. For example, the alignment device has for this purpose a rotary cylinder that can be set rotating, by which the container inclined relative to the horizontal by a pre-specified angle, e.g. between about 10° and 20°, is set in a jerking motion directed parallel to the underside of the container, i.e. parallel to the angle of inclination. Further, there can be provided for the rotary cylinder a stop on which direction and velocity of the jerking motion reverse in a jolting manner, so that the edges of the value documents located in the container are aligned with the container wall that is the lower one with regard to the inclined position of the container, due to the mass inertia of the value documents. Altogether, this enables an aligning of the value documents that is simply and compactly realized and reliable.

It is further particularly preferred that the alignment device is located below the removal position. Preferably, the output position is further located above the removal position. Alternatively or additionally, the input module can have a conveying unit for conveying the following second container such that the second container is conveyed by the alignment device in a straight motion, in particular in the vertical direction, to the removal position and/or from the removal position in the direction of the output position and back to the removal position again. By one or more of the hereinabove mentioned measures it is possible to convey a following second container located in the region of the alignment device, after the alignment of the value documents located therein, from the alignment device to the first container located in the removal position by merely one conveying unit, for example a lift, and to transport the latter in the manner according to the invention to the output position preferably lying above the input position. The construction of the input module can thereby be realized especially simply and compactly.

It is further preferred that the input module is of displaceable configuration so as to be displaced in particular toward a value-document processing apparatus. For example, the input module bears wheels or rollers on which it can be displaced. The input module is in the simplest case pushed by an operating person, but a motor drive for the wheels or rollers can also be provided. The input module and the value-document processing apparatus can further be so configured that they can be coupled to each other temporarily or permanently. The input module is so displaced toward the value-document processing apparatus that the removal opening of the housing of the input module lies in the region of the input pocket of the value-document processing apparatus at least temporarily, in particular while the value documents removed from a container are being fed to the value-document processing apparatus.

BRIEF DESCRIPTION OF THE DRAWINGS

Further features, advantages and application possibilities of the present invention will result from the following description in connection with the figures. There are shown.

DETAILED DESCRIPTION OF VARIOUS EMBODIMENTS

Figure 1:
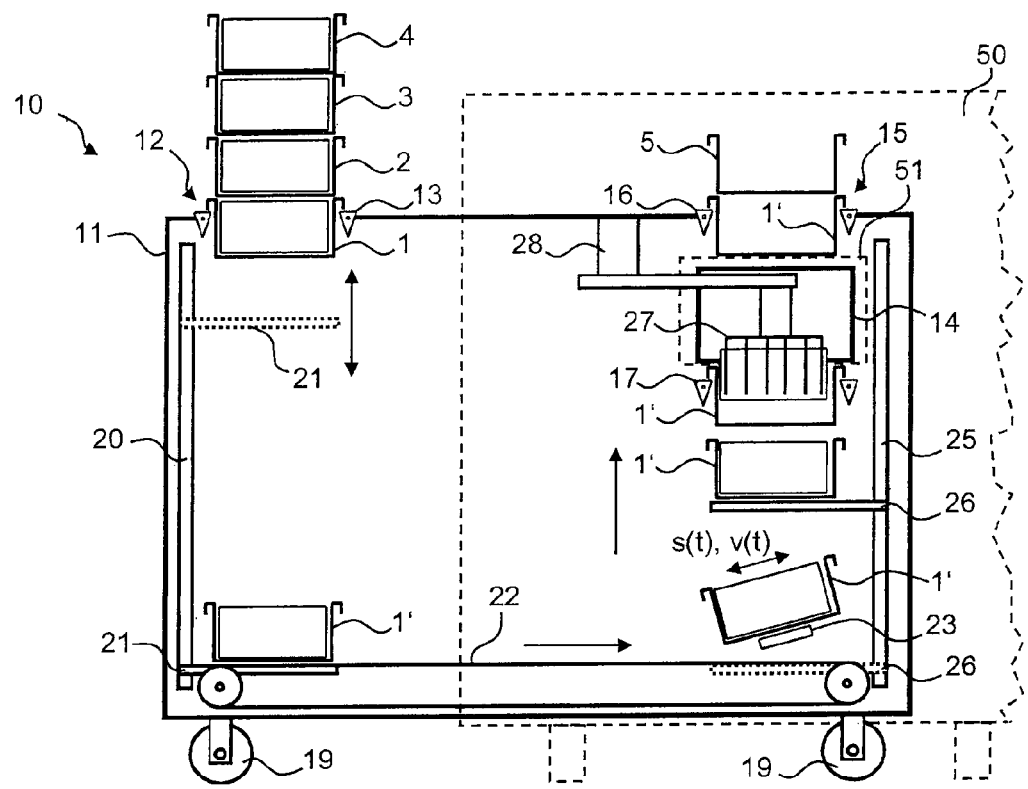
FIG. 1 a schematic construction of a removal module together with a value-document processing apparatus.

FIG. 1 shows a schematic construction of a removal module 10 together with a value-document processing apparatus 50.

The removal module 10 has a preferably substantially closed housing 11 which is of displaceable configuration so as to be able to be displaced toward the value-document processing apparatus 50. For this purpose, the removal module can bear wheels or rollers 19. In the simplest case, the removal module 10 can be pushed to the value-document processing apparatus 50 by an operating person. However, it is alternatively or additionally also possible to equip the removal module 10 with a suitable drive, for example an electric motor, which drives the wheels of the removal module 10 and therefore facilitates the displacement. Alternatively or additionally, the value-document processing apparatus 50 can also draw the input module 10 toward itself.

In the region of a receiving opening 12 in the housing 11 there is provided a receiving device 13 at which one or more containers 1 to 4 filled with bank notes, in particular bank-note stacks, can be received. In the represented example, the receiving device 13 has two holding elements on which an upper circumferential edge of the lowermost container 1 rests. The receiving device 13 and/or the containers 1 to 4 are preferably so configured that on a container 1 received by the receiving device 13 there can be stacked further containers 2, 3, 4 (or even more).

The receiving device 13 and/or the receiving opening 12 of the input module is preferably configured such that the orientation of the container 1 in the receiving position is predetermined and reproducible. For this purpose, the receiving device 13 and/or the receiving opening can have e.g. a mechanical anti-rotation protection. The container can then be received in the receiving opening 12 only in the correct orientation. This ensures that the emptying of the storage regions of the container is effected in a certain order, thus maintaining the correct association of deposits and/or associated header cards or separation cards.

Figure 8A:
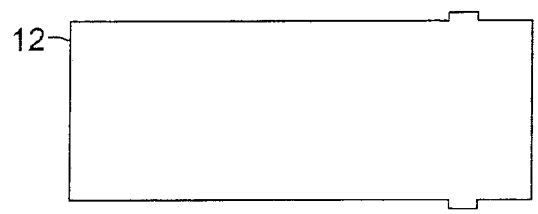
FIGS. 8a-c example of a mechanical anti-rotation protection of the container with respect to the receiving opening.
Figure 8B:
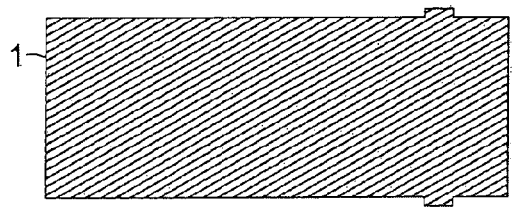
Figure 8C:
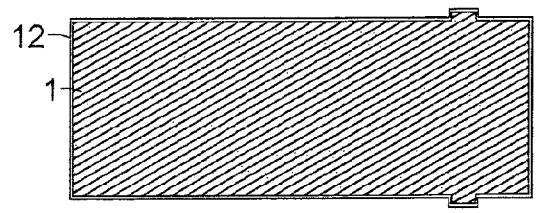

The anti-rotation protection is realized e.g. by an asymmetric configuration of the receiving opening 12 of the housing 11 and a corresponding asymmetry of the container, cf. FIGS. 8a-c. For example, the container 1 has two projections only on the right container side and not on the left container side, cf. FIG. 8b. The receiving opening 12 accordingly also has recesses only on the right side, cf. FIG. 8a, so that the container 1 can be received in the receiving opening 12 only in the orientation shown in FIG. 8b, cf. FIG. 8c. However, there can also be employed as a mechanical anti-rotation protection safety hooks which are present only on one of two opposing sides of the receiving opening 12 and which are released by means of a projection of the container that is present only on one of two opposing sides of the container.

Alternatively or additionally to the mechanical anti-rotation protection there can also be present on or neighboring to the receiving device 13 at least one sensor for detecting the orientation of the container received in the receiving position. If a false orientation is detected, a warning is emitted.

In the interior of the housing 11 there is provided a first conveying unit 20 by which the respectively lowermost container 1 of the container stack formed by the containers 1 to 4 can be removed from the receiving device 13 downward in the vertical direction. For this purpose, the first conveying unit 20 can be configured for example as a lift by which a support element 21 can be displaced vertically. The first conveying unit 20 can preferably have a spindle drive or a toothed-belt drive by which the support element 21 is displaced in the vertical direction.

The support element 21 is first conveyed upward in the vertical direction, so that the lowermost container 1 is raised somewhat, whereupon the receiving device 13 releases the container 1, for example by the holding elements (indicated only schematically in the figure) being for example horizontally displaced or rotated away. After a subsequent motion of the support element 21 downward in the vertical direction, the lowermost container 1 is then removed from the receiving device 13 and transported downward in the vertical direction until the removed container (hereinafter designated as container 1') comes to lie on a second conveying unit 22, which is realized in the represented example by one or more conveying belts. The holding elements 13 then close again after the transported-off container 1', so that the next container is retained again.

In the represented example, the support element 21 is of fork-like configuration, so that it can be lowered between the individual conveying belts of the second conveying unit 22, and the container 1' can thereby be reliably set down on the conveying belts.

The container 1' is then conveyed by the second conveying unit 22 to an alignment device 23, rendered only very schematically in the represented example, which is configured such that the container 1' is inclined by a pre-specified angle, preferably by about 15°, relative to the horizontal and is thereupon set in a jerking or oscillating motion by which it is moved forward and backward in a direction parallel to the pre-specified angle of inclination relative to the horizontal (see double arrow), thereby causing the bank notes located in the container 1' to be aligned with the lower container wall of the container 1' due to their mass inertia.

The alignment device 23 can have for example a rotary cylinder that can be set rotating, its moving direction being reversed in a jolting manner after contact with a stop. The alignment device 23 or rotary cylinder is preferably so configured that the velocity of the motion of the container 1' increases toward the stop and decreases again after a reversal of direction at the stop. This has the consequence that the bank notes located in the container 1' are aligned with the lower side wall of the container 1' with especially high reliability.

Figure 2:
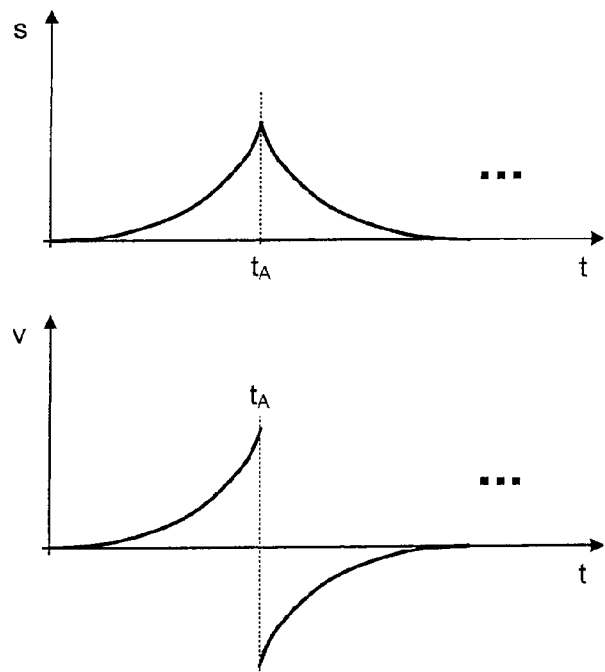
FIG. 2 a time course of the path covered by a container in the alignment device (upper part of figure) and of the corresponding velocity of the container (lower part of figure)

FIG. 2 shows by way of example the time course of the path s covered by the container 1' in the alignment device 23 (upper part of figure). As can be seen by the non-linear course of the path s over the time t until the time point $t_A$ at which the stop is reached, and in the subsequent reverse motion of the container 1', the velocity is not constant during the jerking motion but gradually increases until the contacting of the stop, on the one hand, and gradually decreases again thereafter. This is illustrated by the corresponding time course of the velocity v of the container 1' during the jerking motion (lower part of figure), from which it is evident that the velocity v of the container 1' continuously rises until the time point $t_A$ when the stop is reached and continuously decreases again (in terms of magnitude) after a reversal of direction, until a new cycle of the oscillating jerking motion finally begins anew.

The time course of the path s and of the velocity v of the container 1' is indicated by way of example in FIG. 2. However, it is basically also conceivable to provide other time courses, for example an approximately linear rise of the velocity v over the time t until the time point $t_A$ when the stop is reached and a corresponding linear drop of the velocity v after the stop is reached.

As is further illustrated by FIG. 1, the container 1' is conveyed upward in the vertical direction after the bank notes located in the container 1' are aligned by means of a third conveying unit 25, which can preferably likewise be configured as a lift with a support element 26 and have a spindle or toothed-belt drive. Preferably, in this case the support element 26 can dip down between the conveying belts of the second conveying unit 22 and remain in a waiting position until the aligning operation is terminated, and only then raise the container 1' from the alignment device 23 and convey it further upward until the container 1' is finally received by holding elements 17 in a removal position in which the bank notes located in the container 1' can be removed by the stack from the container 1' by a gripper 27 and inputted through a removal opening 14 provided in the housing 11 into an input pocket 51 provided at the bank-note processing apparatus 50. There the bank notes of the respectively inputted bank-note stack are singled and fed to processing, in particular checking, counting, sorting or destruction.

Preferably, the gripper 27 is movable by a gripper mechanism 28, rendered only schematically here, such that it can be displaced into the region of the removal opening 14 for removal of bank notes from the container 1' and/or for input of the removed bank notes to the input pocket 51 of the bank-note processing apparatus 50, and be displaced out of said region again after the end of such removal or input.

To enable ascertainment of the positions in the container 1' at which separating elements for separating the individual bank-note stacks are located, mechanical and/or optical sensors and/or a camera are preferably provided. Such separating elements are e.g. walls that are variably positionable in the respective container for physically separating the individual bank-note stacks. On the basis of the thereby obtained position information, the gripper 27 can remove the individual, mutually separated bank-note stacks and input them by the stack to the input pocket 51 of the bank-note processing apparatus 50.

Preferably, there can be provided a wire-based or wireless communication connection by which data can be exchanged between the input module 10 and the bank-note processing apparatus 50, for example about the value documents respectively inputted to the input pocket 51. The bank-note processing apparatus 50 can conversely also communicate to the input module 10 whether or when there is room for a next bank-note stack again in the input pocket 51 out of which the inputted bank notes are continually drawn off by a singler.

The container can have a data carrier, e.g. an NFC chip, from which, in the removal position, information about the value documents contained in the container are read out, e.g. which deposit the value documents of the respective container belong to and, where applicable, also which depositor they belong to. This information can be transmitted via the communication connection to the bank-note processing apparatus 50, and be employed there for the accounting of the deposits. The information on the value documents can also be present in the data carrier in relation to the storage region, i.e. be present individually for each value-document stack located between a respective pair of separating elements, and be accordingly transmitted to the bank-note processing apparatus 50 in relation to the storage region.

When the container 1' located in the input position has been emptied, it is transported to an output device 16 provided in the region of an output opening 15 of the housing 11, by which device it is held in an output position in which it can finally be removed from the input module 10 again by an operating person.

The output device 16 can—like the receiving device 13—preferably receive not only one but a plurality of empty containers, with the respectively lowermost container, in the shown example the container 1', resting with its upper edge on holding elements of the output device 16, while one or more further containers 5 can be stacked on the lowermost container 1' located in the output device 16.

Altogether, the filled containers 1 to 4 inputted to the receiving opening 12 of the input module 10 by an operating person are thus conveyed within the input module 10 along a U-shaped transport path, to be removable from the output opening 15 by an operating person again after emptying.

Since a plurality of containers can simultaneously be inputted to the receiving opening 12, conveyed in the interior of the input module 10 and received, in particular stacked, in the output opening 15, the input module has the function of a buffer storage for the containers.

Hereinafter the transport of an, in particular emptied, container from the removal position to the output position will be explained more closely with reference to FIGS. 3 to 7.

Figure 3:
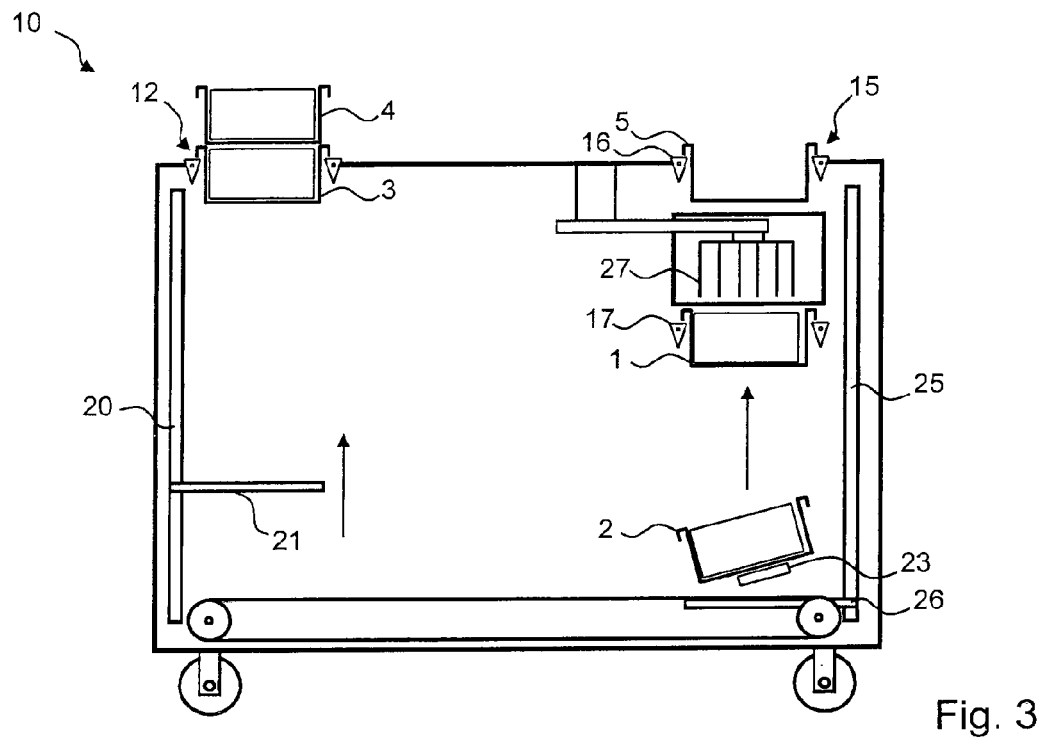
FIG. 3 a schematic construction of a removal module at a first time point.

FIG. 3 shows a schematic construction of the removal module 10 at a first time point at which a first container 1 filled with bank notes is held in the removal position by the holding elements 17 and is ready for the bank notes located in the first container 1 to be removed by the stack by means of the gripper 27.

A following second container 2 is at this time point already located in the alignment device 23 arranged below the removal position, in which device the bank notes located in the second container 2 are subjected to aligning in the manner described more closely hereinabove.

The support element 26 moved by the third conveying unit 25 is located at this time point below the second container 2 and can convey it upward in the vertical direction after the end of the aligning operation.

At the first time point represented here, it is further possible that the support element 21 driven by the first conveying unit 20 is already being conveyed upward in the vertical direction in order to remove a further container 3 from the receiving opening 12.

Figure 4:
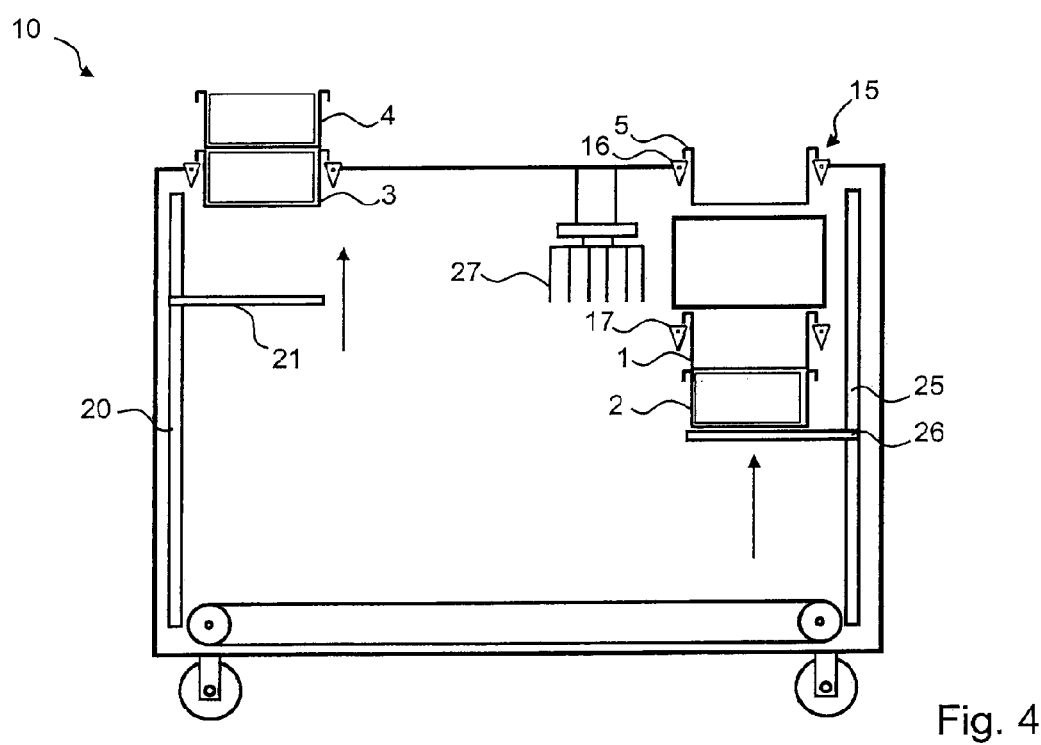
FIG. 4 a schematic construction of a removal module at a second time point.

FIG. 4 shows the removal module 10 at a second, later time point at which the bank notes located in the first container 1 have already been removed from the first container 1 by the gripper 27 and inserted through the removal opening 14 into an input pocket of a bank-note processing apparatus. The first container 1 still located in the removal position is hence empty.

Figure 5:
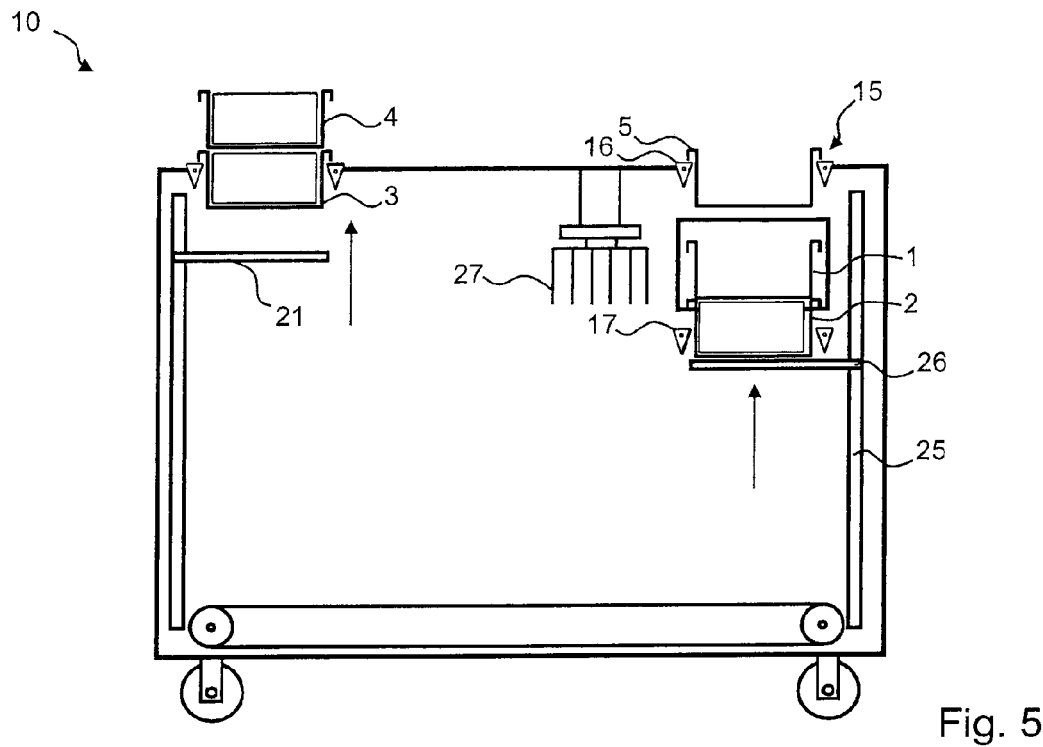
FIG. 5 a schematic construction of a removal module at a third time point.

The second container 2 conveyed vertically upward by the third conveying unit 25 and lying on the support element 26 contacts with its upper edge the underside of the first container 1 at this time point. Upon a continuation of the vertical upward motion the first container 1 is then taken along by the second container 2, lifted out of its original removal position and transported in the direction of the output position in the region of the output opening 15. This is illustrated in FIG. 5 by the third time point represented therein at which the second container 2 transporting the first container 1 upward has already passed the removal position at the height of the holding elements 17.

Figure 6:
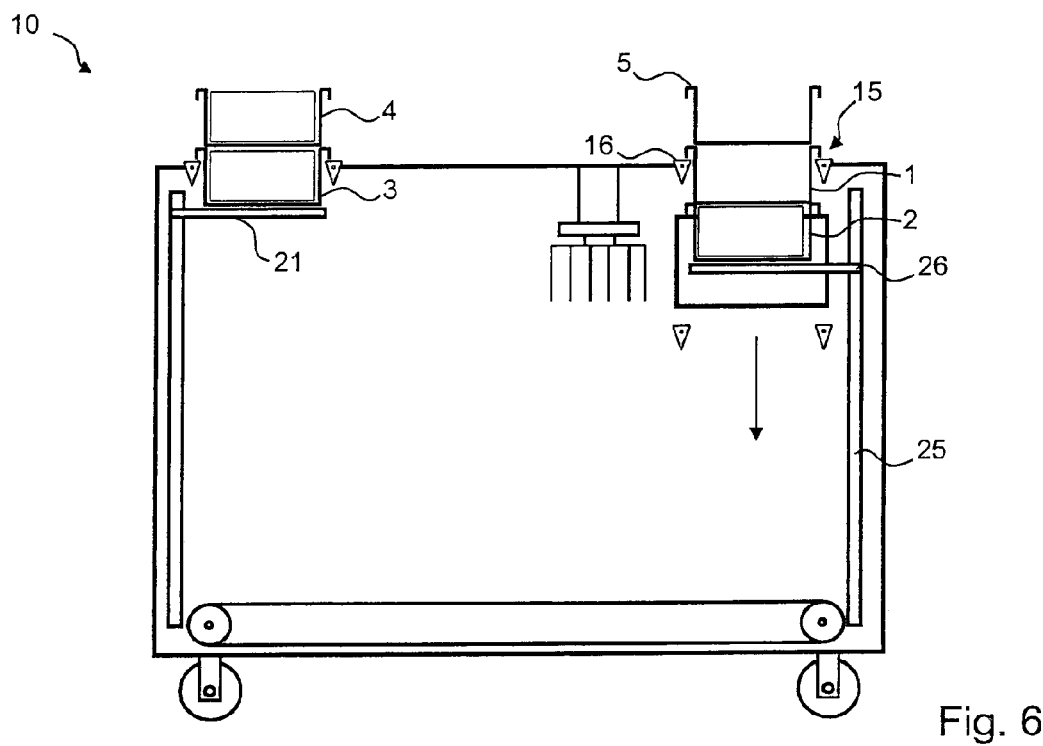
FIG. 6 a schematic construction of a removal module at a fourth time point.

By a further continuation of the conveying of the second container 2 upward, the latter finally inserts the first container 1 into the holding elements 16 provided in the region of the output opening 15 and is received and held by said elements in the output position represented in FIG. 6. Upon displacement of the first container 1 into the output opening 15 a further container 5 already received there is shifted upward and forms with the first container 1 a container stack in the region of the output opening 15.

Figure 7:
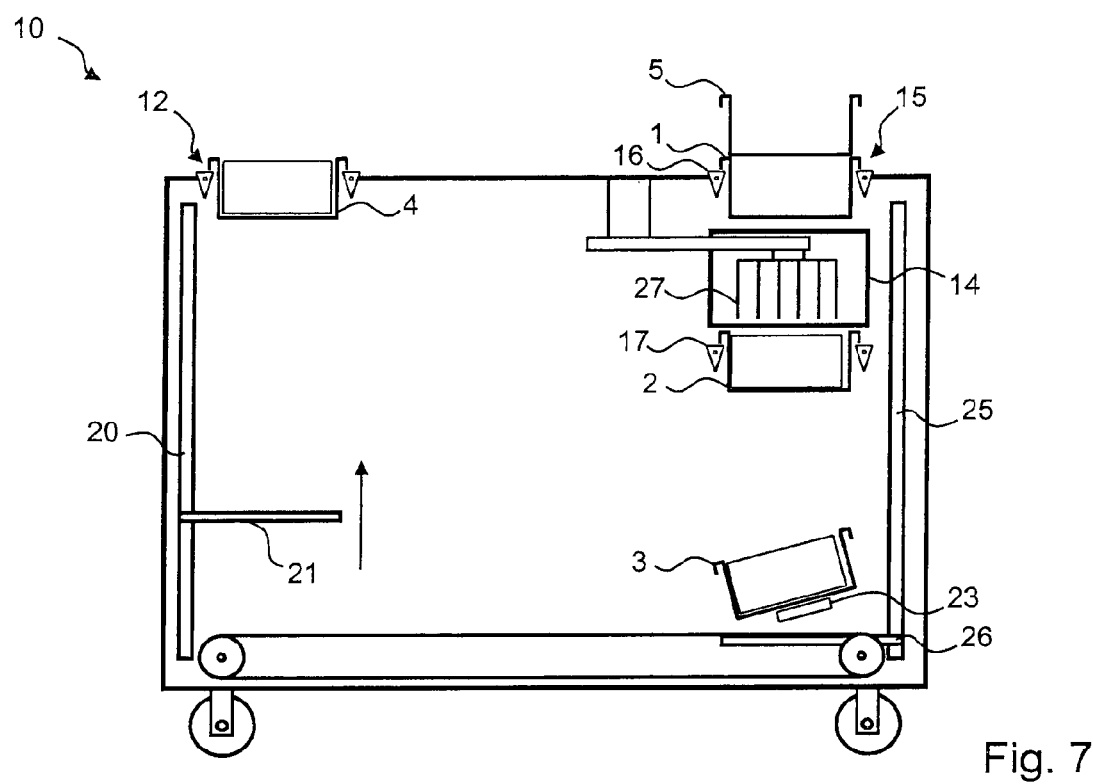
FIG. 7 a schematic construction of a removal module at a fifth time point.

The second container 2 still filled with bank notes is now conveyed downward in the vertical direction by means of the third moving unit 25 and thereby reaches the holding elements 17 again and is finally held thereby in a removal position in which the bank notes located in the second container 2 can be removed by means of the gripper 27 displaced into the input region again and be inserted, preferably by the stack, through the input opening 14 into an input pocket of a bank-note processing apparatus until the second container 2 has likewise been emptied. The situation at the beginning of the removal operation at a fifth time point is illustrated in FIG. 7.

At this time point a third container 3 meanwhile removed from the input opening 12 is already located in the alignment device 23, so that after the emptying of the second container 2 located in the input position and the termination of the aligning operation on the bank notes located in the third container, the procedure described hereinabove with reference to the first and second containers 1 and 2 can now be carried out anew in a corresponding manner with the second and third containers 2 and 3.

The invention claimed is:

1. An input module for feeding value documents to at least one value-document processing apparatus having:
   a receiving device for receiving at least one container in which value documents are located, in a receiving position in which the at least one container can be supplied,
   a removal device for removing value documents from a container located in a removal position and for feeding the removed value documents to a value-document processing apparatus, an output device for receiving at least one container in an output position in which the container can be removed, and a conveying device which is configured for conveying a container located in the receiving position out of the receiving position into the removal position in which value documents can be removed from the container by the removal device, and which is configured for conveying a container located in the removal position out of the removal position into the output position in which the container can be received by the output device.

2. The input module according to claim 1, wherein the receiving device and/or the receiving opening have a mechanical anti-rotation protection structure for orienting the container in the receiving position in a predetermined and reproducible orientation such that the container is received in the receiving position only in such orientation.

3. The input module according to claim 1, wherein the receiving opening has an asymmetric configuration due to which the container can be received in the receiving position only in exactly one orientation, and wherein the container has a corresponding asymmetry.

4. The input module according to claim 1, wherein the container located in the removal position, from which the value documents are removed and fed to a value-document processing apparatus, is a first container, and the conveying device is configured for conveying a second container such that
the first container located in the removal position is transported by contact with the second container conveyed by the conveying device, out of the removal position into the output position in which the first container can be received by the output device, and
the second container is thereupon conveyed into the removal position.

5. The input module according to claim 4, wherein the conveying device for conveying the second container is configured such that upon transport of the first container from the removal position to the output position the second container contacts a side, at the underside, of the first container.

6. The input module according to claim 4, wherein the conveying device for conveying the second container is configured such that upon transport of the first container from the removal position to the output position the second container docks to the first container and/or couples to the first container.

7. The input module according to claim 4, wherein the conveying device for conveying the second container is configured such that upon transport of the first container from the removal position to the output position the first container is lifted or pushed by the second container.

8. The input module according to claim 1 having a housing which has:

a receiving opening at which the receiving device is provided, a removal opening at which the removal device is provided, so that value documents removed from the container located in the removal position can be fed through the removal opening to a value-document processing apparatus, and an output opening at which the output device is provided.

9. The input module according to claim 1 having an alignment device for aligning value documents located in a container.

10. The input module according to claim 9, wherein the alignment device is designed for setting the container in an oscillating motion by which the container is moved alternately in a first direction and in a second direction opposite the first direction, wherein the velocity of the motion of the container increases in the first direction until the time point of the reversal of the direction and the velocity of the motion of the container decreases in the second direction after the time point of the reversal of the direction.

11. The input module according to claim 1 having a conveying unit for conveying the container such that the container is conveyed in a straight motion, in the vertical direction, from the alignment device to the removal position and/or from the removal position in the direction of the output position and back to the removal position again.

12. The input module according to claim 1, wherein the input module comprises wheels or rollers on which it is displaceable toward a value-document processing apparatus.

13. A system for processing value documents having a value-document processing apparatus for processing value documents and an input module according to a claim 1.

14. A method for feeding value documents out of an input module to at least one value-document processing apparatus having the following steps:
a) supplying at least one container in which value documents are located, in a receiving position of a receiving device of the input module,
b) conveying the container located in the receiving position out of the receiving position into a removal position of the input module, in which position value documents are removed from the container,
c) removing value documents from the container located in the removal position using a removal device of the input module,
d) feeding the value documents removed from the container to a value-document processing apparatus using the removal device of the input module,
e) conveying the container located in the removal position out of the removal position into an output position in which the container is received by an output device of the input module,
f) removing the container located in the output position.

* * * * *